Patented Feb. 1, 1944

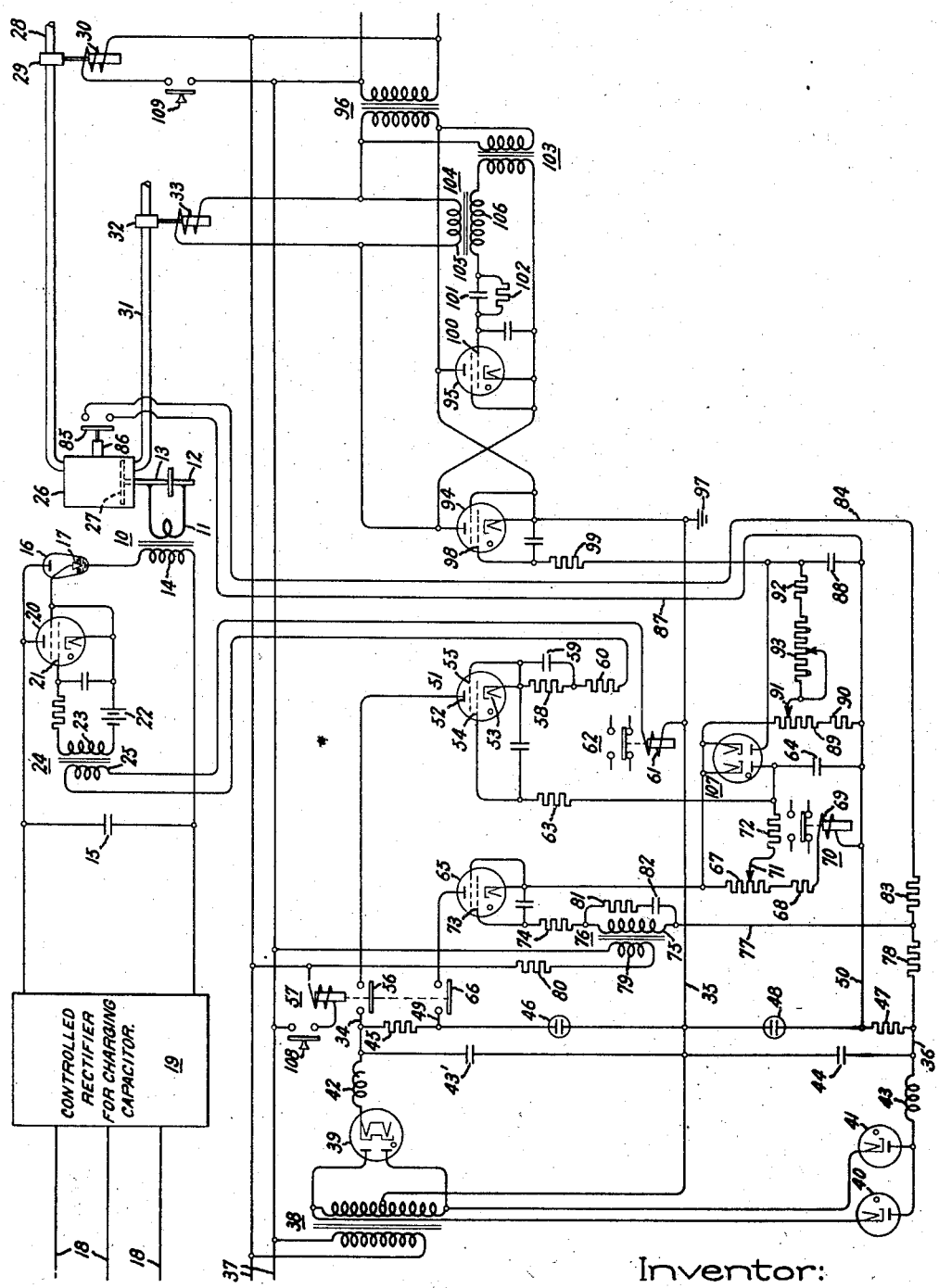

2,340,694

UNITED STATES PATENT OFFICE 2,340,694

ELECTRIC CONTROL CIRCUIT

George L. Rogers, Schenectady, N. Y., assignor to General Electric Company, a corporation of New York Application November 19, 1942, Serial No. 466,125

11 Claims. (Cl. 219—4)

My invention relates to improved electric control circuits and more particularly to improved electric valve control circuits for timing a plurality of operations. My invention is particularly adapted for coordinating the supply of current and application of pressure to the electrodes of a resistance welding machine.

In industrial applications, it is often desirable to time accurately the initiation of a plurality of operations with respect to one another. In some applications, the interval between two operations to be initiated is very short and, in some cases, is shorter than the time required for completing one of the operations. For example, in resistance welding, it has been found desirable to apply a pressure of greater magnitude during the latter part of the period of weld current or shortly thereafter to accomplish a forging function. Where the welding current is of short duration, such as, for example, in capacitor discharge welders, the time required for increasing the pressure, which usually involves the operation of solenoid valves or the like, is longer than the total interval between the initiation of welding current and the instant at which the increase in pressure is desired. In accordance with the teachings of my invention, I provide a new and improved electric control circuit for timing a plurality of operations and which is particularly adapted for coordinating the current and pressure cycles of a resistance welding machine.

It is an object of my invention to provide a new and improved electric control circuit.

It is another object of my invention to provide a new and improved electric valve timing circuit.

It is another object of my invention to provide a new and improved electric control circuit for coordinating the initiation of a plurality of operations at closely spaced intervals of time.

It is still another object of my invention to provide a new and improved electric valve control circuit for coordinating the current and pressure cycles of electric resistance welding machines.

In accordance with the illustrated embodiment of my invention, the initiation of welding current is controlled by an electric valve in the discharge circuit of the capacitor and the welding pressure applied to the welding electrode is controlled by means of a solenoid valve. The conduction of the electric valve and the operation of the solenoid valve is coordinated by an improved electric valve timing circuit which includes an electric valve for initiating the operation of two timing circuits in response to the closure of an initiating switch and the movement of the electrodes into proper work-engaging position and the proper application of welding pressure to the welding electrodes. One of the timers controls the conduction of the electric valve in the discharge circuit of the capacitor and the other timing circuit controls the energization of the solenoid valve to effect a change in the pressure applied to the welding electrodes. The timing circuits are energized from a direct-current voltage and are synchronized with an alternating-current supply circuit from which the solenoid valve is energized so that the solenoid valve is always energized at the same time in the alternating-current voltage wave. This renders the time of operation of the solenoid valve uniform and permits an accurate timing of the pressure cycle controlled by the valve with respect to the welding current by adjustment of the two timing circuits.

My invention will be better understood by reference to the following description taken in connection with the accompanying drawing and its scope will be pointed out in the appended claims. In the drawing, the single figure is a schematic representation of one embodiment of my invention.

Referring now to the drawing, I have shown my invention embodied in a capacitor discharge welding system including a welding transformer 10 having a secondary winding 11, connected to energize the electrodes 12 and 13 of a welding machine, and a primary winding 14 connected to be energized by the discharge of a capacitance 15 through an electric valve means 16 which, as illustrated, is of the type employing an immersion-ignitor type of control member 17. The capacitance 15 is connected to be charged from a polyphase alternating-current supply 18 through a suitable charge-controlling means, such as a controlled rectifier illustrated diagrammatically at 19. The control of the charging rectifier 19 and the discharge valve means 16 may to advantage incorporate features of control of the prior invention of Louis G. Levoy, Jr., as disclosed and claimed in application S. N. 384,247, filed March 20, 1941, and my prior invention as disclosed and claimed in my application S. N. 404,853, filed July 31, 1941. Both of the above applications are assigned to the assignee of the present invention. The initiation of discharge of capacitance 15 and the resulting energization of the welding transformer 10 is controlled by an electric valve 20, preferably of the gaseous-discharge type, having the anode-cathode circuit thereof connected between the anode and the control member 17 of the electric valve 16. The electric valve 20 is provided with a control member or grid 21 and is normally maintained nonconducting by a source of negative-biasing potential supplied by a battery 22. The electric valve 20 is rendered conductive by means of a voltage impulse impressed on the control member 21 thereof by the secondary winding 23 of a transformer 24 having the primary winding 25 thereof energized at a definite time under the control of my improved timer circuit as will be described more in detail at a later point in the specification.

In the interest of simplification, the welding machine with the exception of the electrodes 12 and 13 and a pressure cylinder 26 and operating piston 27 for the electrode 13 has been omitted from the drawing. Fluid pressure for moving electrode 13 into work-engaging position is supplied, from a source (not shown), by a conduit 28 under the control of a solenoid valve 29 having an operating coil 30. As a means for increasing the pressure applied to the work by the welding electrode 13, I provide an exhaust conduit 31 communicating with the lower side of piston 27 and which is controlled by a solenoid valve 32 having an operating coil 33 which is energized at an accurately timed instant with respect to the initiation of conduction of the electric valve 16 and the resulting energization of the welding transformer.

As a source of voltage for the timing circuits for controlling the energization of transformer 24 and solenoid valve 29, I provide a three-wire direct-current supply circuit comprising conductors 34, 35, and 36 which are energized from a source of alternating-current control voltage 37 by means of transformer 38 and suitable unilaterally conducting devices, such as gas-filled electric discharge devices 39, 40, and 41. The direct-current voltages impressed on conductors 34, 35, and 36 are filtered by series inductive reactors 42 and 43 and shunt capacitors 43' and 44. In order to provide a regulated direct-current voltage for the timing circuits and, in this way, still further increase the accuracy of the control, I connect a resistor 45 and a constant voltage device 46, such as a cold cathode gaseous discharge device, in series across conductors 34 and 35 and a resistor 47 and a constant voltage device 48 across the conductors 35 and 36. A conductor 49 connected to the common terminal of resistor 45 and constant voltage device 46 and a conductor 50 connected to the common terminal of the resistor 47 and constant voltage device 48 provide a source of regulated direct-current voltage.

As previously mentioned, the initiation of discharge of capacitor 15 and, as a result, energization of the welding transformer is accomplished by supplying an impulse of voltage to the primary winding 25. This is accomplished by controlling the conductivity of an electric discharge device 51 of the type utilizing an ionizable medium and including an anode 52, a cathode 53, a control member or grid 54, and a shield grid 55 which is connected directly to the cathode. The anode-cathode circuit of the electric valve 51 is completed from the direct-current supply conductor 34 to the conductor 35 through the normally open contact 56 of a relay 57, a resistor 58 and a parallel capacitor 59, a resistor 60, the primary winding 25 of the transformer 24, and the operating coil 61 of a relay 62. The control member 54 of the electric valve 51 is connected through a current-limiting resistor 63 to the positive terminal of a capacitor 64 which is charged from the regulated supply comprising conductors 49 and 50 through an electric discharge device 65. The anode-cathode circuit of the discharge device 65 is connected from conductor 49 through a normally open contact 66 of the relay 57, voltage-dividing resistors 67 and 68, and the operating coil 69 of an electromagnetic relay 70. The capacitor 64 is connected between the conductor 50 and an adjustable tap 71 on the resistor 67 through a resistor 72. It is apparent that, when relay 57 is energized, the anode-cathode circuit of electric valves 51 and 65 are complete and, when electric valve 65 is rendered conducting, the capacitor 64 is charged from the voltage appearing between conductors 49 and 50 at a rate dependent upon the magnitude of the capacitor 64, resistor 72, and the setting of the adjustable tap 71 on resistor 67. The control member 73 of electric valve 65 is normally maintained at a negative voltage with respect to the conductor 50 by means of the voltage appearing across the resistor 47. As illustrated in the drawing, control member 73 is connected through a current-limiting resistor 74, the secondary winding 75 of a peaking transformer 76, conductor 77, resistor 78, and resistor 47 to the conductor 50. The primary winding 79 of transformer 76 is connected through a resistor 80 to the alternating-current control voltage supply 37. A loading resistor 81 and capacitor 82 are connected across the secondary of the transformer 76 to improve the peaking characteristic of the transformer. The conductor 77, which is connected to the control member 73 of electric valve 65, is also connected to conductor 50 through a resistor 83, conductor 84, the normally open contact 85 of a switch illustrated diagrammatically at 86, and conductor 87. The switch 86 is operatively associated with the cylinder 26 of the welding machine and is arranged to close its contact 85 upon the attainment of a predetermined pressure in the cylinder 26 or, as an alternative, in accordance with the pressure and position of the welding electrode 13. It will be apparent from an inspection of the drawing that, with the contact 85 closed, the resistors 78 and 83 are connected across the resistor 47 and, by virtue of the connection of conductor 77 with the common terminal of these resistors, the negative bias on the control member 73 of valve 65 is reduced. The reduction is insufficient, however, to render the electric valve 65 conducting until the first positive impulse is produced in the transformer secondary winding 75. In this way, initiation of conduction of electric valve 65 is synchronized with the voltage of the alternating-current circuit 37.

When electric valve 65 is rendered conducting, a charging circuit is also established for a capacitor 88. From the drawing, it will be noted that the cathode of the electric valve 65 is connected to the conductor 50 of the direct-current supply through voltage-dividing resistors 89 and 90 which are connected in parallel with resistors 67 and 68 and the coil of relay 70. The positive terminal of the capacitor 88 is connected with an adjustable tap 91 on the resistor 89 through the fixed resistor 92 and an adjustable tapped resistor 93. The voltage of capacitor 88 controls the energization of the operating coil 33 of the solenoid valve 32 by controlling initiation of conduction of an electric discharge valve 94 which is the leading valve of a pair of reversely connected electric valves 94 and 95 which are energized from the alternating-current supply circuit 37 through a transformer 96. The operating coil 33 of the solenoid valve 32 is connected in series with the reversely connected valves 94 and 95 across the secondary winding of the transformer 96. As illustrated in the drawing, the cathode of electric valve 94 is connected with the conductor 35 of the direct-current supply circuit and is preferably grounded as indicated at 97. The control member 98 of electric valve 94 is connected with the positive terminal of capacitor 88 through a current-limiting resistor 99. The trailing electric valve 95 is provided with a control member 100 which is normally maintained at a negative voltage by means of a self-biasing circuit including a parallel connected capacitor 101 and resistor 102 and a hold-off component of alternating-current voltage which is impressed on the control member 100 by a secondary winding of a transformer 103 having the primary winding thereof energized from the secondary winding of the transformer 96. In order to render the electric valve 95 conducting for each half cycle of the supply circuit 37 following a period of conduction of valve 94, I provide a transformer 104 having the primary winding 105 thereof connected across the operating coil 33 of the solenoid 32. The secondary winding 106 of this transformer is connected in the cathode-to-control-member circuit of electric valve 95 to impress a turn-on voltage on the control member in response to energization of the coil 32.

In order to provide for the rapid discharge of capacitors 64 and 88 which control the electric valves 51 and 94, respectively, I provide an electric discharge device 107 which is provided with two discharge paths, one of which is connected between the cathode of electric valve 65 and the positive terminal of capacitor 64 and the other of which is connected between the cathode of electric valve 65 and the positive terminal of the capacitor 88. From an inspection of the drawing, it will be seen that this device removes the resistor 72 from the discharge circuits of capacitor 64 and the resistors 92 and 93 from the discharge circuits of capacitor 88 and, in this way, insures the relative rapid discharge of these capacitors when electric valve 65 is rendered non-conducting.

The operating coil of the relay 57 is connected to be energized from the alternating-current supply circuit 37 through a switch 108 and the operating coil 30 of the solenoid valve 29 is connected to be energized from the supply circuit 37 through a switch 109. In the drawing, switches 108 and 109 have been illustrated as separate manual switches. However, in practice, both of these switches may be controlled by a pedal or other operating member of the welding machine.

Certain features relating to the control of discharge valve 16, as described above, are disclosed and claimed in the aforementioned applications; Levoy, Jr., S. N. 384,247, filed March 20, 1941, and my application S. N. 404,853, filed July 31, 1943.

A brief description of the operation of the illustrated embodiment of my invention will bring out more clearly the features and advantages of my present invention. Let it be assumed that all of the electric valves have the cathodes thereof at operating temperature and that the controlled rectifier 19 has operated to charge the capacitor 15 to a predetermined value. If, now, it is desired to make a weld, switches 108 and 109 are closed, operating relay 57 to closed position to complete the anode-cathode circuits of electric valves 51 and 65 and energizing the operating coil 30 of the solenoid valve 29 to close the movable electrode 13 on the work to be welded. When certain mechanical conditions regarding electrode pressure and position are attained, as determined by the switch 86, contact 85 is closed to reduce the negative or hold-off voltage on resistor 83 of electric valve 67 by an amount dependent upon the relative magnitudes of resistors 72 and 83. These resistors are so chosen that the reduction bias is not sufficient to render the electric valve 65 conducting. However, at the next positive voltage peak impressed on the control member 73 by the secondary winding 75 of transformer 76, electric valve means 65 conducts and the charging of timing capacitors 64 and 88 is initiated simultaneously. The charging rate of capacitor 64 is determined by the magnitude of resistor 72 and the position of the slider 71 on resistor 67. The charging rate of capacitor 88 is determined by the magnitude of resistor 92, tapped resistor 93, and the position of the taps 91 on resistor 89. The taps on resistor 93 are spaced at increments of resistance which are sufficient to change the time required for capacitor 88 to charge to a predetermined value in increments of one cycle of the alternating-current circuit 37. By choosing the time at which capacitor 88 charges sufficiently to render electric valve 94 conductive so that it fall within the negative half cycle of anode-cathode voltage of the valve 94, it is apparent that the valve will start to conduct at the beginning of the next half cycle of voltage. In this way, any variation in the charging of capacitor 88 within a half-cycle range will not change the time at which electric valve 94 is rendered conductive and, as a result, the operating coil 33 of the solenoid valve 32 is always energized at the same time in the alternating-current voltage wave. This is important in a circuit where precision timing is desired inasmuch as variations in the operating time of the solenoid are substantially eliminated. When the capacitor 64 charges to a predetermined value, the control member 54 of the valve 51 is made more positive than the conductor 35 to which the cathode of the valve 51 is connected and valve 51 is rendered conductive. The initial impulse of current through valve 51, the capacitor 59, and the primary winding 25 of transformer 24 induces a voltage in the winding 23 which renders firing valve 20 conductive. This renders electric valve 16 conductive and initiates the discharge of capacitor 15 through the welding transformer primary winding 14.

Summarizing the operation briefly, conduction of the valve 65 establishes a reference time which is synchronized with the alternating-current supply voltage of circuit 37. At independently adjustable times after this reference, electric valves 51 and 94 are rendered conductive to initiate the current cycle and an increase in pressure applied to the welding electrodes, respectively. Inasmuch as the energization of the welding transformer is substantially instantaneous and the increase in pressure on the electrodes may require a cycle or so to accomplish, it is sometimes necessary to adjust the timing circuit including capacitor 88 to render electric valve 94 conductive prior to the time electric valve 51 is rendered conductive even though the increased pressure is to be applied only after the completion of the welding current impulse. In the operation of the illustrated embodiment of the invention, adjustments in the timing of the current impulse with respect to the increase in electrode pressure may be made in one-cycle steps by means of the adjustable tap on resistor 93 and fractions of a cycle variation accomplished by adjusting the timing circuit including electric valve 51 and capacitor 64. In this way, the latter timing circuit is required to operate over a range which varies very little and, as a result, it may be made to operate very precisely. As previously pointed out, synchronizing the timing energization of the operating coil 33 of the solenoid valve 32 renders the operating time of the valve substantially constant and makes it possible to take account of this operating time when adjusting the charging circuits of capacitors 64 and 88.

In the description of the illustrated embodiment of the invention, relays 62 and 70 were described as having the operating coils thereof connected in circuit with the electric valves 51 and 65, respectively. These relays are not essential to the operation of the illustrated embodiment of the invention and may be employed for initiating any controlling function which it is desired to effect upon the initiation of conduction of electric valves 51 and 65, respectively.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. In combination, a welding circuit including welding electrodes, means including an electromagnetic device for controlling the pressure exerted on work received between said electrodes, means including an electric valve for controlling the energization of said welding electrodes, an alternating-current circuit, means including a second electric valve for controlling the energization of said electromagnetic device from said alternating-current circuit, a pair of capacitors, means including a third electric valve for initiating charging of said capacitors simultaneously and in synchronous relation with the voltage of said alternating-current circuit, means for independently adjusting the charging rates of said capacitors, means responsive to the voltage on one of said capacitors for rendering said first-mentioned electric valve conductive when the charge on said one capacitor reaches a predetermined value to initiate energization of said welding electrodes, and means responsive to the voltage of the other of said capacitors for rendering said second electric valve conductive to energize said electromagnetic device and effect a change in the pressure exerted on the work at an accurately predetermined timed instant with respect to the initiation of energization of said welding electrodes.

2. In combination, a welding circuit including welding electrodes, means including an electromagnetic device for controlling the pressure exerted on work received between said electrodes, means including an electric valve for controlling the energization of said welding electrodes, an alternating-current circuit, means including a second electric valve for controlling the energization of said electromagnetic device from said alternating-current circuit, a pair of capacitors, means including a third electric valve for initiating charging of said capacitors simultaneously and in synchronous relation with the voltage of said alternating-current circuit when said electrodes are exerting a predetermined pressure on the work, means for independently adjusting the charging rates of said capacitors, means responsive to the voltage on one of said capacitors for rendering said first-mentioned electric valve conductive when the charge on said one capacitor reaches a predetermined value to initiate energization of said welding electrodes, and means responsive to the voltage of the other of said capacitors for rendering said second electric valve conductive to energize said electromagnetic device and effect an increase in the pressure exerted on the work at an accurately predetermined timed instant with respect to the initiation of energization of said welding electrodes.

3. In combination, a welding circuit including welding electrodes, means including an electromagnetic device for controlling the pressure exerted on work received between said electrodes, means including an electric valve for controlling the energization of said welding electrodes, an alternating-current circuit, means including a second electric valve for controlling energization of said electromagnetic device from said alternating-current circuit, a pair of timers, a third electric valve, means for rendering said third electric valve conductive in synchronim with said alternating-current circuit and only after said electrodes have been moved into work-engaging position and are exerting a predetermined pressure thereon, means for independently adjusting the periods of operation of said timers, means responsive to operation of one of said timers for controlling said first-mentioned electric valve to initiate energization of said electrodes, and means responsive to operation of the other of said timing devices for energizing said electromagnetic device to increase the pressure exerted on the work at an accurately predetermined timed instant with respect to the energization of said welding electrodes.

4. In combination, a welding circuit including welding electrodes, means including an electromagnetic device for controlling the pressure exerted on work received between said electrodes, means including an electric valve for controlling the energization of said welding electrodes, an alternating-current circuit, means including a second electric valve for controlling energization of said electromagnetic device from said alternating-current circuit, a pair of timers, a third electric valve, means for rendering said third electric valve conductive in synchronism with said alternating-current circuit to establish a reference time, means for independently adjusting the period of operation of said timers, means responsive to operation of one of said timers for controlling said first-mentioned electric valve to initiate energization of said electrodes, and means responsive to operation of the other of said timing devices for energizing said electromagnetic device to increase the pressure exerted on the work at an accurately predetermined timed instant with respect to the energization of said welding electrodes.

5. In combination, a welding circuit including welding electrodes, means including an electric valve for controlling the energization of said welding electrodes, means for operating said electrodes into work-engaging position and for exerting a predetermined working pressure on said electrodes, an alternating-current circuit, means including an electromagnetic device connected to be energized from said alternating-current circuit for effecting a change in the pressure exerted on said electrodes, a source of unidirectional voltage, a pair of capacitors, a second electric valve, and a pair of independently adjustable charging circuits connecting said capacitors with said source of unidirectional voltage through said second electric valve, means for rendering said second electric valve conducting to initiate simultaneously the charging of said capacitors and to establish a reference time, means responsive to the voltage of one of said capacitors for controlling the energization of said electromagnetic device to energize said device in synchronism with said alternating-current circuit, means responsive to the voltage of the other of said capacitors for rendering said first-mentioned electric valve conductive to initiate energization of said electrodes so that the energization of said electrodes and the change in pressure exerted on said electrodes occur at predetermined times after said reference time.

6. In combination, a welding circuit including welding electrodes, means including an electric valve for controlling the energization of said welding electrodes, means for operating said electrodes into work-engaging position and for exerting a predetermined working pressure on said electrodes, an alternating-current circuit, means including an electromagnetic device connected to be energized from said alternating-current circuit for effecting a change in the pressure exerted on said electrodes, a source of unidirectional voltage, a pair of capacitors, a second electric valve, and a pair of independently adjustable charging circuits connecting said capacitors with said source of unidirectional voltage through said second electric valve, means for rendering said second electric valve conducting in synchronism with said alternating-current circuit to initiate simultaneously the charging of both of said capacitors and to establish a reference time, means for adjusting one of said charging circuits in steps which alter the time required for the associated capacitor to charge to a predetermined value in steps corresponding to integral cycles of said alternating-current circuit, means responsive to the voltage of said one capacitor for controlling the energization of said electromagnetic device to energize said device in synchronism with said alternating-current circuit, means responsive to the voltage of the other of said capacitors for rendering said first-mentioned electric valve conductive to initiate energization of said electrodes so that the energization of said electrodes and the change in pressure exerted on said electrodes occur at predetermined times after said reference time.

7. In combination, an alternating-current circuit, a welding circuit including welding electrodes, means including an electric valve for transmitting to said electrodes an impulse of current of short duration with respect to the period of said alternating-current circuit, means for moving said electrodes into work-engaging position and for exerting a welding pressure on said electrodes, means including an electromagnetic device requiring a long period to operate as compared with said impulse current for modifying the pressure exerted on said electrodes in timed relation with respect to said impulse of current, means for determining the instants at which said electrodes are energized and said pressure is modified comprising a voltage supply, a second electric valve and a pair of capacitors connected in series and across said voltage supply so that a charging circuit is established for both said capacitors through said valve when said valve is rendered conducting, means for rendering said second electric valve conducting to establish a reference time, means responsive to the voltage of one of said capacitors for controlling said electromagnetic device, and means responsive to the voltage of the other of said capacitors for controlling said first-mentioned electric valve to effect the energization of said electrodes and the modification of the pressure exerted thereon at accurately predetermined timed instants with respect to said reference time.

8. In combination, an alternating-current circuit, a welding circuit including welding electrodes, means including an electric valve for transmitting to said electrodes an impulse of current of short duration with respect to the period of said alternating-current circuit, means for moving said electrodes into work-engaging position and for exerting a welding pressure on said electrodes, means including an electromagnetic device energized from said alternating-current circuit and requiring a long period to operate as compared with said impulse of current for modifying the pressure exerted on said electrodes in timed relation with respect to said impulse of current, means for determining the instants at which said electrodes are energized and said pressure is modified comprising a voltage supply, a second electric valve, and a pair of parallel connected capacitors connected in series and across said voltage supply so that a charging circuit is established for both said capacitors through said valve when said valve is rendered conducting, means for rendering said second electric valve conducting in synchronism with said alternating-current circuit to establish a reference time, means responsive to the voltage of one of said capacitors for controlling said electromagnetic device, and means responsive to the voltage of the other of said capacitors for controlling said first-mentioned electric valve to effect the energization of said electrodes and the modification of the pressure exerted thereon at accurately predetermined timed instants with respect to said reference time.

9. In combination, an alternating-current circuit, a direct-current supply circuit, an electric valve and a pair of capacitors connected to said direct-current circuit so that a charging circuit is established for each of said capacitors when said electric valve is rendered conductive, a resistance connected in the charging circuit of one of said capacitors and adjustable in steps which vary the time required for charging said one capacitor to a predetermined value in increments of integral cycles of said alternating-current circuit, and an adjustable resistance in the charging circuit of the other of said capacitors to vary the time required for said other capacitor to charge to a predetermined value in increments which are small compared with a cycle of said alternating-current circuit, and means responsive to the charge of said capacitors for initiating different operations at accurately displaced intervals of time.

10. In combination, a source of direct current, an electric valve and a resistance element connected in series across said source of direct current, a capacitor and a resistance element connected in series and across at least a portion of the first-mentioned resistance element so that the capacitor is charged through a circuit including said electric valve and said last-mentioned resistance element when said valve is conducting, and an uncontrolled electric valve shunting at least a portion of the resistance in series with said capacitor and poled to discharge said capacitor when said first-mentioned electric valve is nonconducting.

11. In combination, a source of direct current, an electric valve and a resistance element connected in series across said source of direct current, a pair of capacitors connected to be charged in parallel from said source of direct current through said electric valve, adjustable impedance means in the charging circuits of each of said capacitors, and a pair of unilaterally conducting paths connected between the charging circuits of said capacitors and the anode-cathode circuit of said electric valve to shunt at least a portion of the impedance in the charging circuits of said capacitors and poled to conduct when said electric valve is nonconducting to establish discharge circuits for said capacitors excluding a substantial portion of the impedance in the charging circuits thereof.

GEORGE L. ROGERS.